United States Patent
Liu

(10) Patent No.: US 8,164,891 B2
(45) Date of Patent: Apr. 24, 2012

(54) ELECTRONIC DEVICE WITH COVERED EXPANSION CARD BAY

(75) Inventor: Zhi-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 316 days.

(21) Appl. No.: 12/685,091

(22) Filed: Jan. 11, 2010

(65) Prior Publication Data

US 2011/0122585 A1    May 26, 2011

(30) Foreign Application Priority Data

Nov. 26, 2009   (CN) .......................... 200910310516

(51) Int. Cl.
*G06F 1/16* (2006.01)
*G11B 17/04* (2006.01)
*G11B 23/03* (2006.01)

(52) U.S. Cl. ........... 361/679.32; 361/679.31; 360/99.06; 720/741; 720/743

(58) Field of Classification Search .. 361/679.01–679.4, 361/679.55–679.59, 724–727, 759, 755, 361/740, 752, 796, 797, 731, 756, 816, 818, 361/807, 810; 360/99.01–99.07; 312/223.1, 312/223.2; 439/136, 138
See application file for complete search history.

(56) References Cited

U.S. PATENT DOCUMENTS

| | | | | |
|---|---|---|---|---|
| 5,559,672 A * | 9/1996 | Buras et al. | ............... | 361/679.32 |
| 5,701,216 A * | 12/1997 | Yamamoto et al. | ......... | 360/99.02 |
| 6,411,583 B1 * | 6/2002 | Yamamoto et al. | ........... | 720/647 |
| 6,421,247 B1 * | 7/2002 | Fuchimukai | ................... | 361/759 |
| 6,558,175 B1 * | 5/2003 | Yu | ................... | 439/138 |
| 7,104,817 B2 * | 9/2006 | Shiue et al. | .................. | 439/137 |
| 2005/0138652 A1 * | 6/2005 | Liao et al. | ..................... | 720/647 |

* cited by examiner

*Primary Examiner* — Zachary M Pape
*Assistant Examiner* — Nidhi Desai
(74) *Attorney, Agent, or Firm* — Altis Law Group, Inc.

(57) ABSTRACT

An electronic device includes a housing, an expansion card holder, and a protective cover assembly. The housing defines an opening. The expansion card holder is located inside the housing. The protective cover assembly includes a rotary shaft unit, and a cover rotatably connected to the main body via the rotary shaft unit. The cover includes a main body made of soft material, and an elastic member embedded in the main body. The main body includes a cover portion covering the opening, a resisting portion resisting against the housing, and a connecting portion interconnecting the cover portion and the resisting portion. The elastic member includes a first elastic arm and a second elastic arm. The first and the second elastic arms are embedded in the cover portion and the resisting portion, respectively. The elastic member provides a resilient force to the cover portion to open or seal the opening automatically.

10 Claims, 6 Drawing Sheets

ELECTRONIC DEVICE WITH COVERED EXPANSION CARD BAY

BACKGROUND

1. Technical Field

The present disclosure generally relates to electronic devices and, particularly, to an electronic device with a covered expansion card bay.

2. Description of Related Art

Currently, many computer systems or other electronic devices employ multiple expansion cards to increase storage space and/or install desired applications. Expansion cards can include a PCMICA card (Personal Computer Memory International Association card), a PC card (Personal Computer card), express card, or other.

A frequently used electronic device includes a housing defining an opening with an expansion card holder located inside the housing and adjacent to the opening of the housing. An expansion card can be inserted into the expansion card holder via the opening. The electronic device further includes a rubber plug covering the opening of the housing for protection. However, it is time-consuming and inconvenient to replace the rubber plug after use. In addition, the rubber plug is prone to loss, thereby increasing the likelihood of damages to the electronic device.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
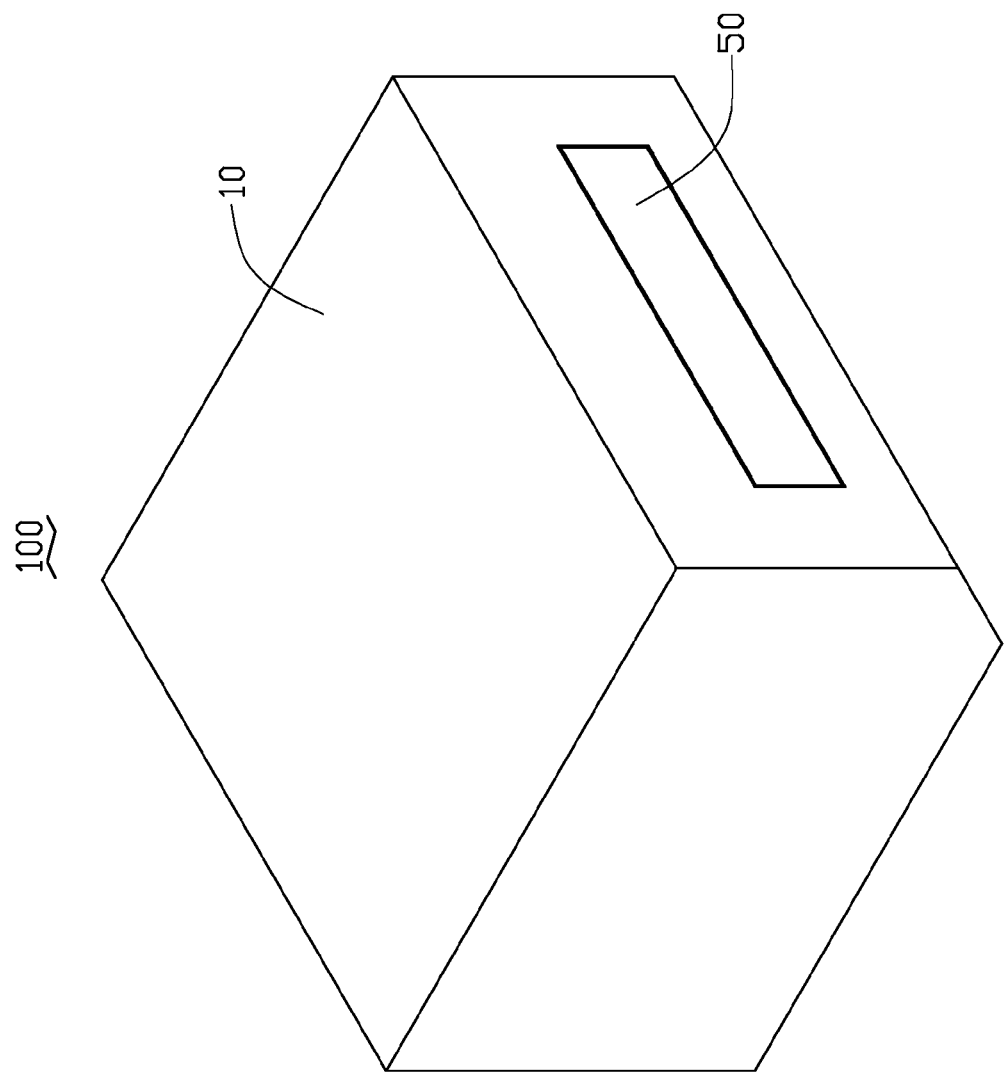
FIG. 1 is an isometric view of an embodiment of an electronic device.
Figure 2:
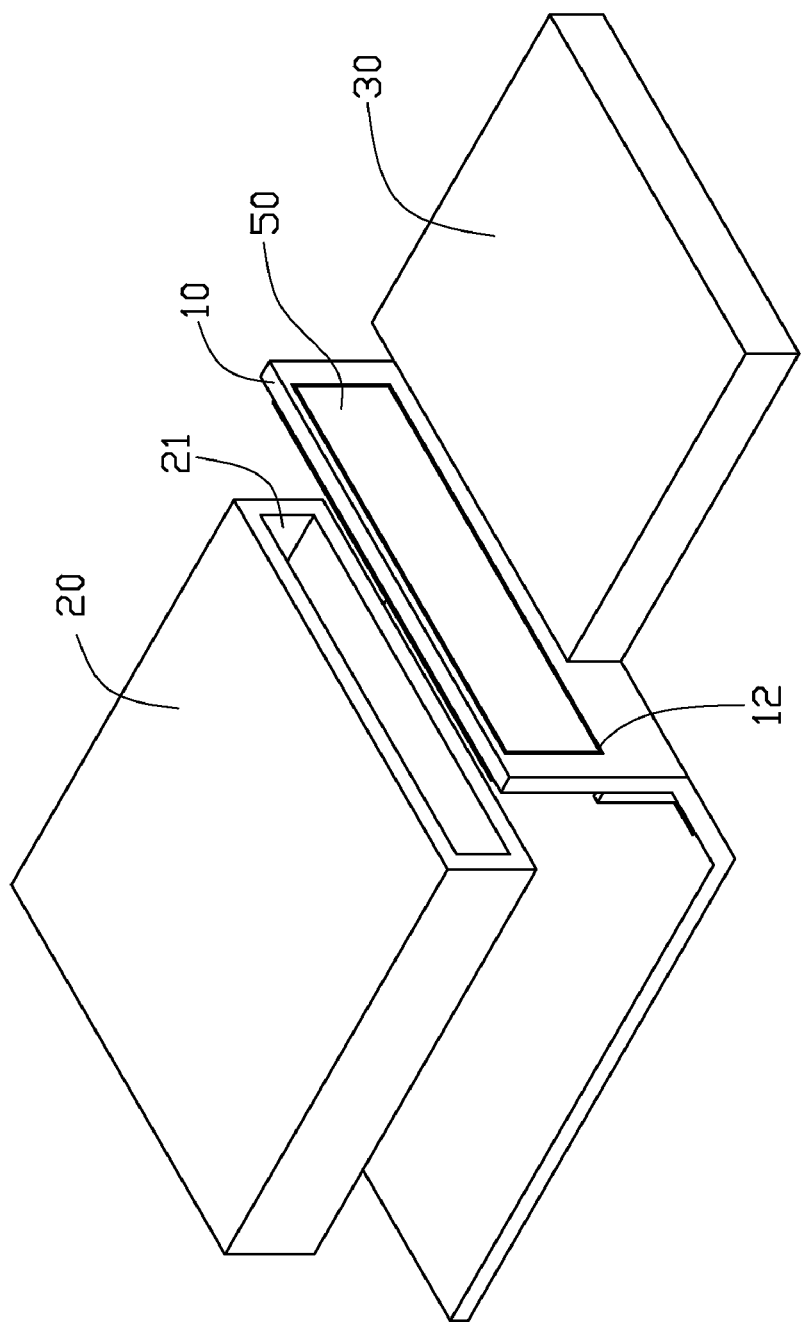
FIG. 2 is a partial assembled isometric view of the electronic device of FIG. 1 with an expansion card, the electronic device including a protective cover assembly including a cover.

Referring to FIGS. 1 and 2, an embodiment of an electronic device 100 includes a housing 10, an expansion card holder 20, and a protective cover assembly 50. The housing 10 defines an opening 12. The expansion card holder 20 is located inside the housing 10, and is adjacent to the opening 12. The expansion card holder 20 defines a bay 21 facing the opening 12 to receive an expansion card 30. The expansion card holder 20 includes a card connector (not shown) inside the bay 21. The expansion card 30 includes a plurality of electrical contacts (not shown) on a sidewall, engaging the card connector. The protective cover assembly 50 is configured to cover the opening 12 and to protect the bay 21 of the expansion card holder 20. The electronic device 100 can be a mobile phone, personal digital assistant (PDA), digital versatile disc (DVD), computer, or other device. The electronic device 100 includes various modules to perform corresponding functions and features, however for the sake of simplicity, in the following embodiment only the protective cover assembly 50 for the expansion card holder 20 is described. In the illustrated embodiment, the electronic device 100 is a computer host.

Figure 3:
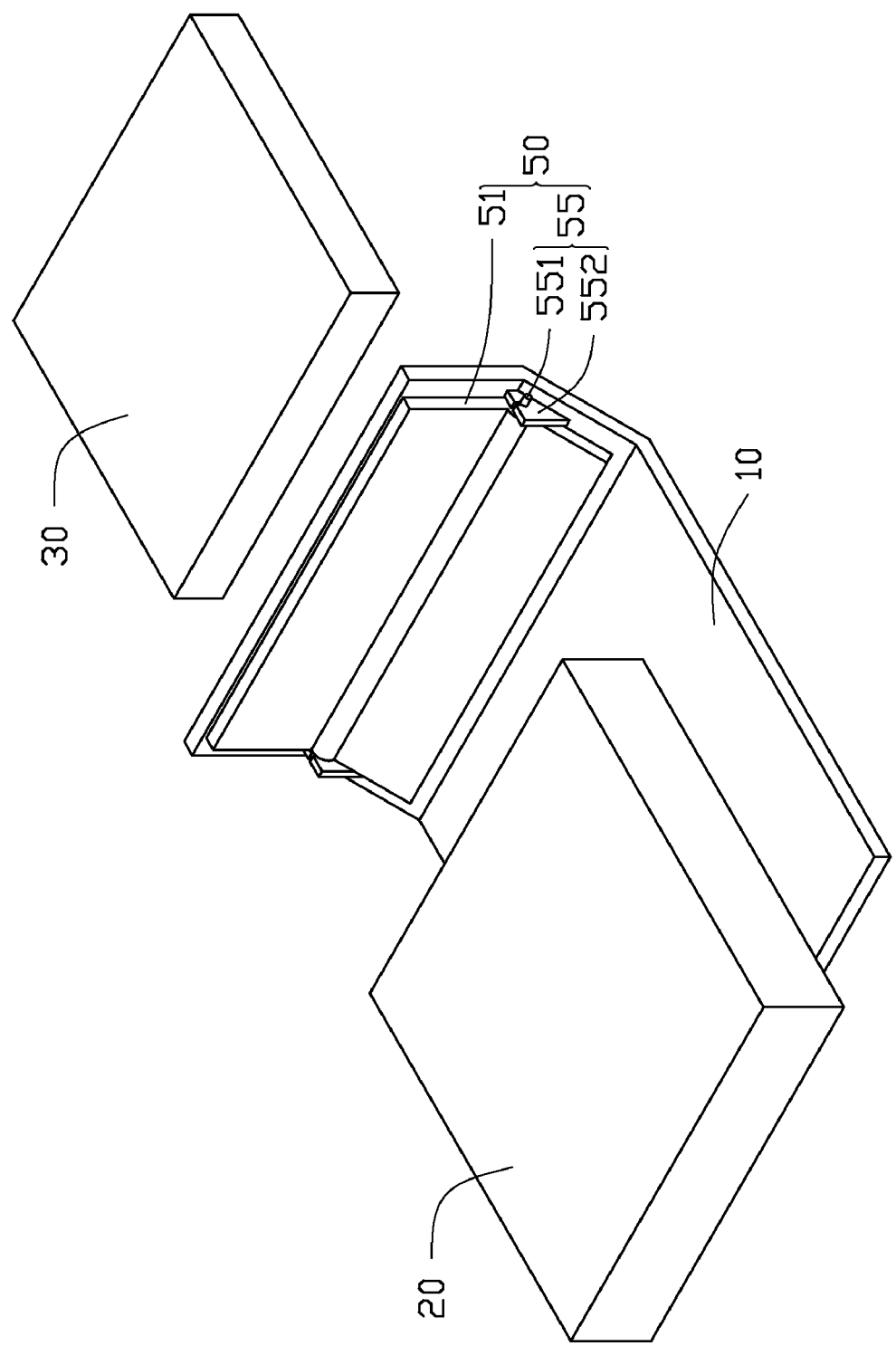
FIG. 3 is similar to FIG. 2, but viewed from another aspect.

Referring to FIG. 3, the protective cover assembly 50 includes a cover 51 and a rotary shaft unit 55. The cover 51 is rotatably connected to the housing 10 via the rotary shaft unit 55.

Figure 4:
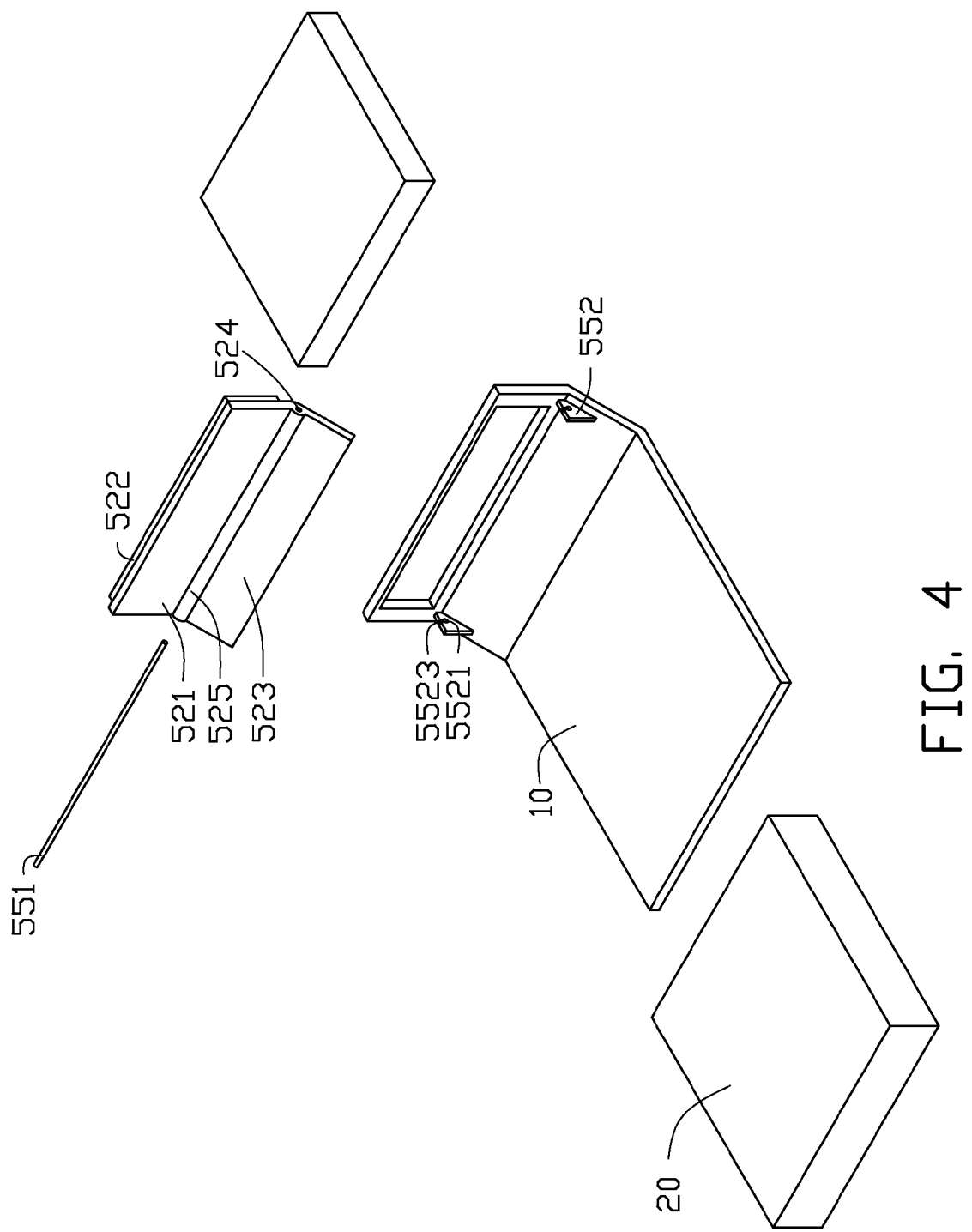
FIG. 4 is an exploded, partial isometric view of the electronic device of FIG. 3 with an expansion card.
Figure 5:
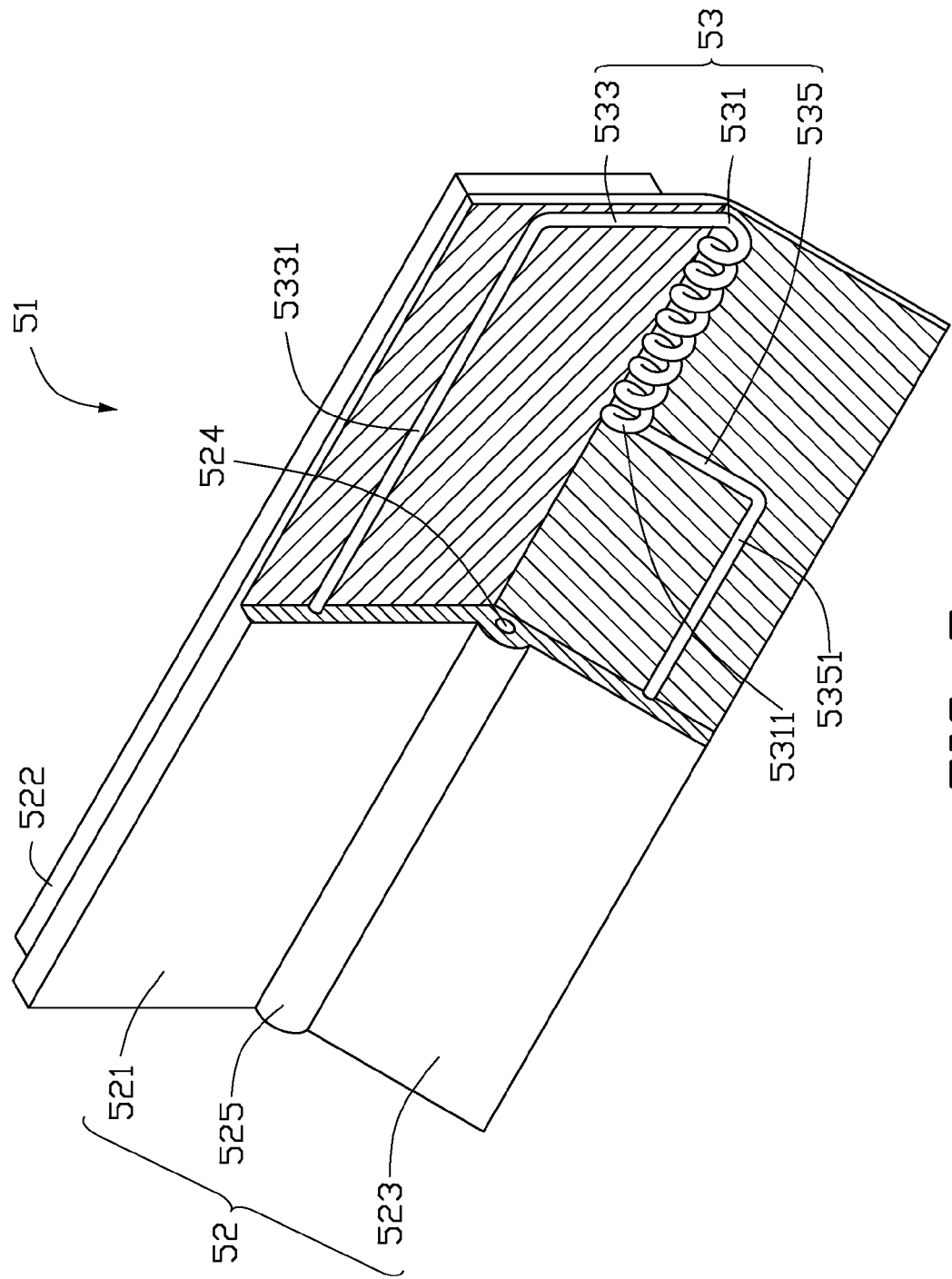
FIG. 5 is an enlarged, cut-away view of the cover of FIG. 3.

Referring to FIGS. 4 and 5, the cover 51 includes a cover body 52 made of soft material and an elastic member 53 embedded in the cover body 52.

The cover body 52 includes a substantially rectangular cover portion 521, a substantially rectangular resisting portion 523, and a connecting portion 525 interconnecting the cover portion 521 and the resisting portion 523. The cover portion 521, the resisting portion 523 and the connecting portion 525 are made of the same soft material, such as rubber, synthetic resin, or other.

The cover body 52 further includes a rectangular protruding portion 522 formed on a side of the cover portion 521, and configured to seal the opening 12 of the housing 10.

The resisting portion 523 can act to resist or abut against an inner sidewall of the housing 10. Under a normal operating state, an angle defined by the resisting portion 523 and the cover portion 521 is obtuse.

The connecting portion 525 is substantially a hollow cylinder, and defines a through hole 524 along its center axis.

The elastic member 53 includes a cylindrical main body 531, and a first elastic arm 533 and a second elastic arm 535 extending from two ends of the main body 531. The main body 531 defines a cylindrical cavity 5311. The main body 531 is embedded in the connecting portion 525 adjacent to one end of the connecting portion 525, and the cavity 5311 is aligned along the center axis of the through hole 524 of the connecting portion 525. The first elastic arm 533 is embedded in the cover portion 521, and the second elastic arm 535 is embedded in the resisting portion 523. The elastic member 53 further includes a first bending portion 5331 extending from a free end of the first elastic arm 533 and a second bending portion 5351 extending from a free end of the second elastic arm 535. The second bending portion 5351 is substantially parallel to the first bending portion 5331, and the first and the second bending portions 5331, 5351 are substantially parallel to the connecting portion 525, respectively. In the illustrated embodiment, the elastic member 53 is a torsion spring. The main body 531 is a spring body of the torsion spring; and the first and the second elastic arms 533, 535 are two free arms of the torsion spring.

The fabricating method for the cover 51 can be performed in a various ways. In this embodiment, elastic member 53 is integrally formed with the cover body 52 by insert molding.

The rotary shaft unit 55 includes a rotary shaft 551 and a pair of shaft bases 552. The rotary shaft 551 extends parallel to the connecting portion 525 of the cover body 52, and can be received in the through hole 524. The pair of shaft bases 552 is respectively fixed to an inner side of the housing 10 at two ends of the opening 12. Each shaft base 552 defines a shaft hole 5521 adjacent to a top thereof to receive a corresponding end of the rotary shaft 551. Each shaft base 552 further defines a cutout 5523 at the top thereof communicating with the shaft hole 5521. The rotary shaft 551 can be received in the shaft hole 5521 via the cutout 5523.

Referring to FIGS. 3 and 4 again, during assembly of the protective cover assembly 50 to the housing 10, the rotary shaft 551 goes through the through hole 524 and the cavity 5311 extending from two ends of the connecting portion 525.

Two ends of the rotary shaft 551 are received in the two shaft holes 5521, such that the cover 51 is rotatably fixed to the housing 10 and the resisting portion 523 resists the housing 10.

Figure 6:
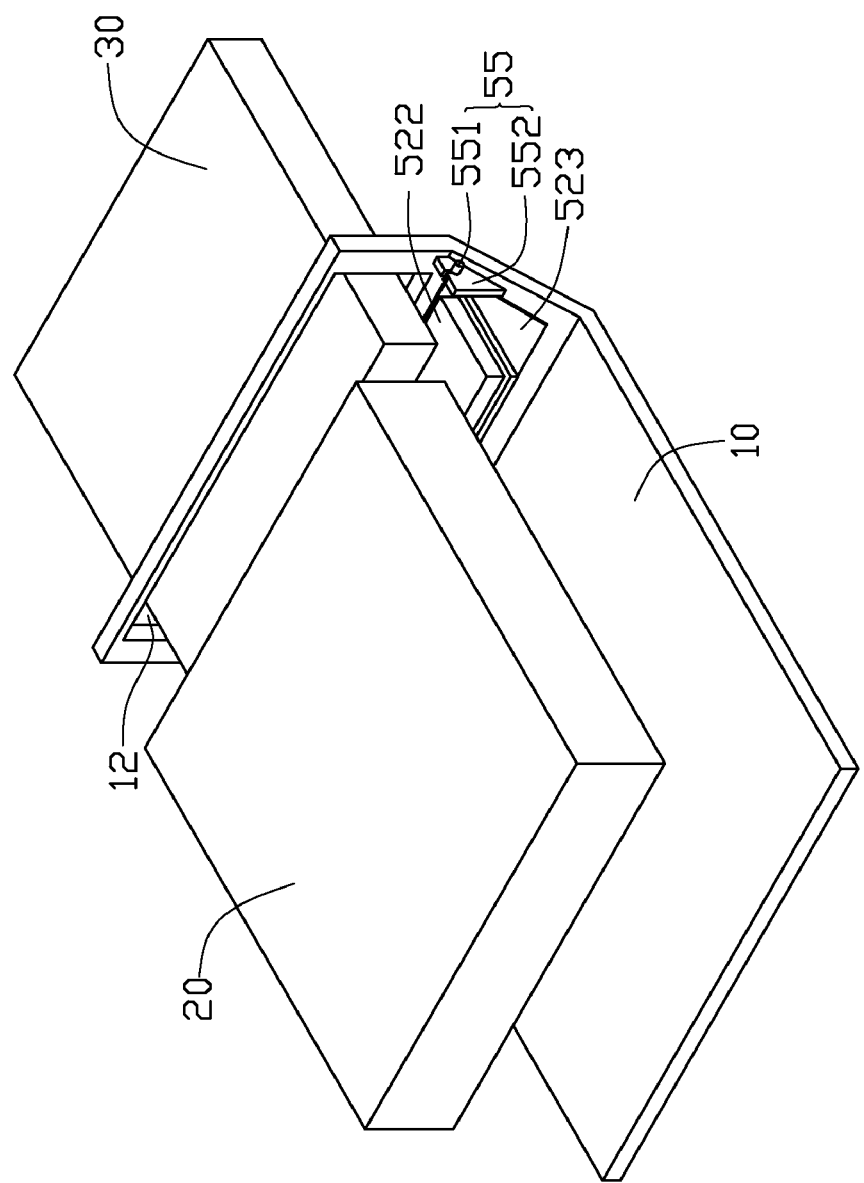
FIG. 6 is an assembled, partial isometric view of the electronic device of FIG. 3 assembled with the expansion card.

Referring to FIG. 6, during insertion of the expansion card 30 into the housing 10, the expansion card 30 is first situated facing the opening 12 to contact the cover 51. The expansion card 30 is continuously pushed towards the bay 21 of the expansion card holder 20 until the electrical contacts of the expansion card 30 engage the card connector of the expansion card holder 20. At the same time, the resisting portion 523 resists or abuts against the inner side of the housing 10, and the cover portion 521 rotates relative to the connecting portion 525, and opens the opening 12. Meanwhile, the first elastic arm 533 moves closer towards the second elastic arm 535, such that the elastic member 53 accumulates rotational energy.

Removal of the expansion card 30 from the expansion card holder 20 is achieved by external force pushing the expansion card 30 toward an inner side of the expansion card holder 20. The expansion card 30 is thus partially ejected from the bay 21 and can then be fully withdrawn from the housing 10. At the same time, the elastic member 53 releases the stored rotational energy and pushes the first elastic arm 533 away from the second elastic arm 535, such that the cover portion 521 rotates backward to reseal the opening 12.

The elastic member 53 provides a resilient force to the cover portion 521 to open or seal the opening 12 automatically, thus facilitating the use of the electronic device 100. In addition, the noise produced by the elastic member 53 during the rotation of the cover portion 521 is minimal, and rust protection is also provided to the elastic member 53 by means of having the elastic member 53 embedded in the cover body 52. Furthermore, the expansion card 30 is protected from abrasion by the cover portion 521 during insertion and removal.

It is to be understood that, in an alternative embodiment, the rotary shaft 551 can be fixed to the housing 10 adjacent to the opening 12, whereby the shaft base 552 can be omitted. The rotary shaft unit 55 can also be replaced by a hinge unit.

It should be noted that, in an alternative embodiment, the main body 531 of the elastic member 53 can also be embedded in the connecting portion 525 in a middle portion thereof. The first bending portion 5331 and the second bending portion 5351 can extend in two different directions, or not be parallel. The first and second elastic arms 533, 535 can also be arranged in other ways, such that the first elastic arm 533 moves closer towards the second elastic arm 535 when the cover portion 521 seals the opening 12. The elastic member 53 is not limited to torsion spring, for example, it can be a plate spring. In this case, the plate spring includes a plate-like first elastic arm and a plate-like second elastic arm connected to the first elastic arm. The protruding portion 522 of the cover body 52 can also be omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
   a housing defining an opening;
   an expansion card holder, located inside the housing and adjacent to the opening, the expansion card holder defining a bay facing the opening to receive an expansion card; and
   a protective cover assembly comprising:
      a rotary shaft unit;
      a cover rotatably connected to the housing via the rotary shaft unit, the cover comprising:
         a cover body made of soft material comprising a cover portion covering the opening, a resisting portion resisting against the housing, and a connecting portion interconnecting the cover portion and the resisting portion;
         an elastic member embedded in the cover body, the elastic member comprising:
            a first elastic arm embedded in the cover portion;
            a second elastic arm embedded in the resisting portion connected to the first elastic arm; wherein the elastic member provides a resilient force to the cover portion to open or seal the opening automatically.

2. The electronic device of claim 1, wherein the elastic member comprises a main body embedded in the connecting portion of the cover body, the first arm and the second arm extend from two ends of the main body, and the resilient force from the elastic member pushing the first elastic arm away from the second elastic arm, such that the cover portion seals the opening automatically.

3. The electronic device of claim 2, wherein the elastic member further comprises a first bending portion extending from an end of the first elastic arm and a second bending portion extending from an end of the second elastic arm; wherein the second bending portion is substantially parallel to the first bending portion.

4. The electronic device of claim 3, wherein the main body of the elastic member is located in the connecting portion adjacent to one end thereof; wherein the first bending portion and the second bending portion are substantially parallel to the connecting portion.

5. The electronic device of claim 2, wherein the elastic member is a torsion spring, the main body is a spring body of the torsion spring; the first elastic arm and the second elastic arm are two free arms of the torsion spring.

6. The electronic device of claim 1, wherein the cover body further comprises a protrusion extending from a sidewall of the cover portion to seal the opening.

7. The electronic device of claim 1, wherein the rotary shaft unit comprises a rotary shaft through the connecting portion and a pair of shaft bases fixed to an inner side of the housing at two ends of the opening, respectively; each shaft base defining a shaft hole adjacent to a top of each shaft base to receive the corresponding rotary shaft.

8. The electronic device of claim 7, wherein each shaft base further defines a cutout at a top of each shaft base communicating with the shaft hole.

9. The electronic device of claim 7, wherein the elastic member comprises a main body embedded in the connecting portion of the cover body interconnecting the first elastic arm and the second elastic arm and the main body defines a cavity to receive the rotary shaft.

10. The electronic device of claim 7, wherein the connecting portion defines a through hole to receive the rotary shaft along a center axis thereof; wherein the cavity is aligned along the center axis of the through hole.

* * * * *